US009471233B1

(12) United States Patent
Goodwin-Jette et al.

(10) Patent No.: US 9,471,233 B1
(45) Date of Patent: Oct. 18, 2016

(54) NAMED MOUNT OPTIMIZATION FOR VIRTUAL TAPE SYSTEMS

(71) Applicant: EMC Corporation, Hopkinton, MA (US)

(72) Inventors: Sandra J Goodwin-Jette, Hudson, NH (US); Larry W McCloskey, Billerica, MA (US); Bruce F Offhaus, Waldoboro, ME (US)

(73) Assignee: EMC Corporation, Hopkinton, MA (US)

( * ) Notice: Subject to any disclaimer, the term of this patent is extended or adjusted under 35 U.S.C. 154(b) by 97 days.

(21) Appl. No.: 14/588,453

(22) Filed: Jan. 1, 2015

(51) Int. Cl.
*G06F 12/00* (2006.01)
*G06F 3/06* (2006.01)

(52) U.S. Cl.
CPC ............ *G06F 3/0619* (2013.01); *G06F 3/0664* (2013.01); *G06F 3/0686* (2013.01)

(58) Field of Classification Search
CPC ... G06F 3/0619; G06F 3/0664; G06F 3/0686
See application file for complete search history.

(56) References Cited

U.S. PATENT DOCUMENTS

| 8,667,239 | B1 | 3/2014 | McCloskey et al. | |
| 8,775,756 | B1 | 7/2014 | McCloskey et al. | |
| 8,793,452 | B1 | 7/2014 | McCloskey et al. | |
| 2004/0044853 | A1* | 3/2004 | Gibble ................. | G06F 3/0605 711/154 |

* cited by examiner

*Primary Examiner* — Shawn X Gu
(74) *Attorney, Agent, or Firm* — Stanford Tomita LLP

(57) ABSTRACT

Embodiments are described for named mounts in a virtual tape engine (VTE) system. A system maintains a file list of named volumes for each of the VTEs. When named mount requests are received, the system searches the file list for the named volume rather than searching through each of the file systems for each of the VTEs. When the volume name is found on a file list, the VTE for the volume name is identified and the mount request can be completed.

20 Claims, 4 Drawing Sheets

| Volume | State |
|---|---|
| ... | ... |
| AB9947 | SCRTCH |
| AB9957 | SCRTCH |
| AB9967 | SCRTCH |
| AB9977 | SCRTCH |
| AB9987 | SCRTCH |
| AB9997 | NAMED |
| AB0001 | NAMED |
| AB0004 | NAMED |
| AB0049 | NAMED |
| AB0061 | NAMED |
| AB0076 | NAMED |
| AB0077 | NAMED |
| AB0078 | NAMED |
| AB0088 | NAMED |
| AB0108 | NAMED |
| AB0110 | NAMED |
| AB0118 | NAMED |
| AB0122 | NAMED |
| AB0125 | NAMED |
| AB0128 | NAMED |
| ... | ... |

FIG. 2

NAMED MOUNT OPTIMIZATION FOR VIRTUAL TAPE SYSTEMS

TECHNICAL FIELD

Embodiments are generally directed to computer backup systems, and more specifically to named mount optimization methods for virtual tape systems.

BACKGROUND

Large-scale mainframe computers continue to be used extensively across many industries. Historically, tape storage has been used to provide permanent and temporary data protection services to those mainframes. In such environments, it is not uncommon for mainframe tape libraries to hold hundreds of TeraBytes (TB) of data spread across tens of thousands of tape volumes.

Virtual tape emulation (VTE) products such as data library for mainframe (DLm) available from EMC Corporation of Hopkinton, Mass. can be used to emulate a given number of tape volumes to the mainframe using disk drives as the storage media instead of magnetic tape. As a mainframe-based application writes data to what it believes is a tape drive, that data is actually stored as a tape volume image on direct access storage device such as a disk array subsystem system. Each individual tape volume written by the mainframe becomes a single disk file on the file system on the disk array.

Such VTE products ultimately allow the operators of mainframe data centers to move from a tape-based backup solution to a disk-based backup solution, leveraging today's high speed low cost disk technology to provide an innovative approach to data storage.

The mainframe host writes data to the virtual tape drive using the same commands as it would as if it were writing to an actual magnetic tape drive. These commands include "mount requests", which are actions that would require a physical tape storing recorded data to be mounted onto a tape drive in a physical tape server system. The mount requests processed by the VTEs can include read and write requests. When data volumes are written to or read from the network storage devices, the virtual tape file system is "mounted" by the VTE.

For a write mount request, a VTE can process an arriving mainframe tape volume and write it as a single file on the disk library for mainframe storage. Each mainframe tape can be stored as a single file having a file name can be the tape volume serial number (VOLSER). The file only consumes as much space as required to store the file resulting in no wasted storage space.

VTEs can be enhanced file system (EFS) VTEs or non-EFS VTEs. A difference between EFS VTEs and non-EFS VTEs is the named volume format. For non-EFS VTEs, volume names in a file system are designated by the first two letters of the tape volume serial number (VOLSER). For example, when a named mount for VOLSER AB1234 is requested, the file system, "/tapelib/AB" which matches the first two letters of the file name. In contrast, on EFS VTEs, there are no requirements that the first two letters of the named volumes designate a specific file system. Thus, a volume having a VOLSER AB1234 can be stored in any file system. When a named mount is requested, the EFS VTE may have to search every file system in order to find the requested VOLSER which can be very time consuming. Thus, a byproduct of the EFS feature is a mount delay which can slow named mount request processing. What is needed is a improved method for system and method for optimizing named mounts on EFS enabled VTEs.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 2 shows a portion of a file list.

DETAILED DESCRIPTION

Figure 1:
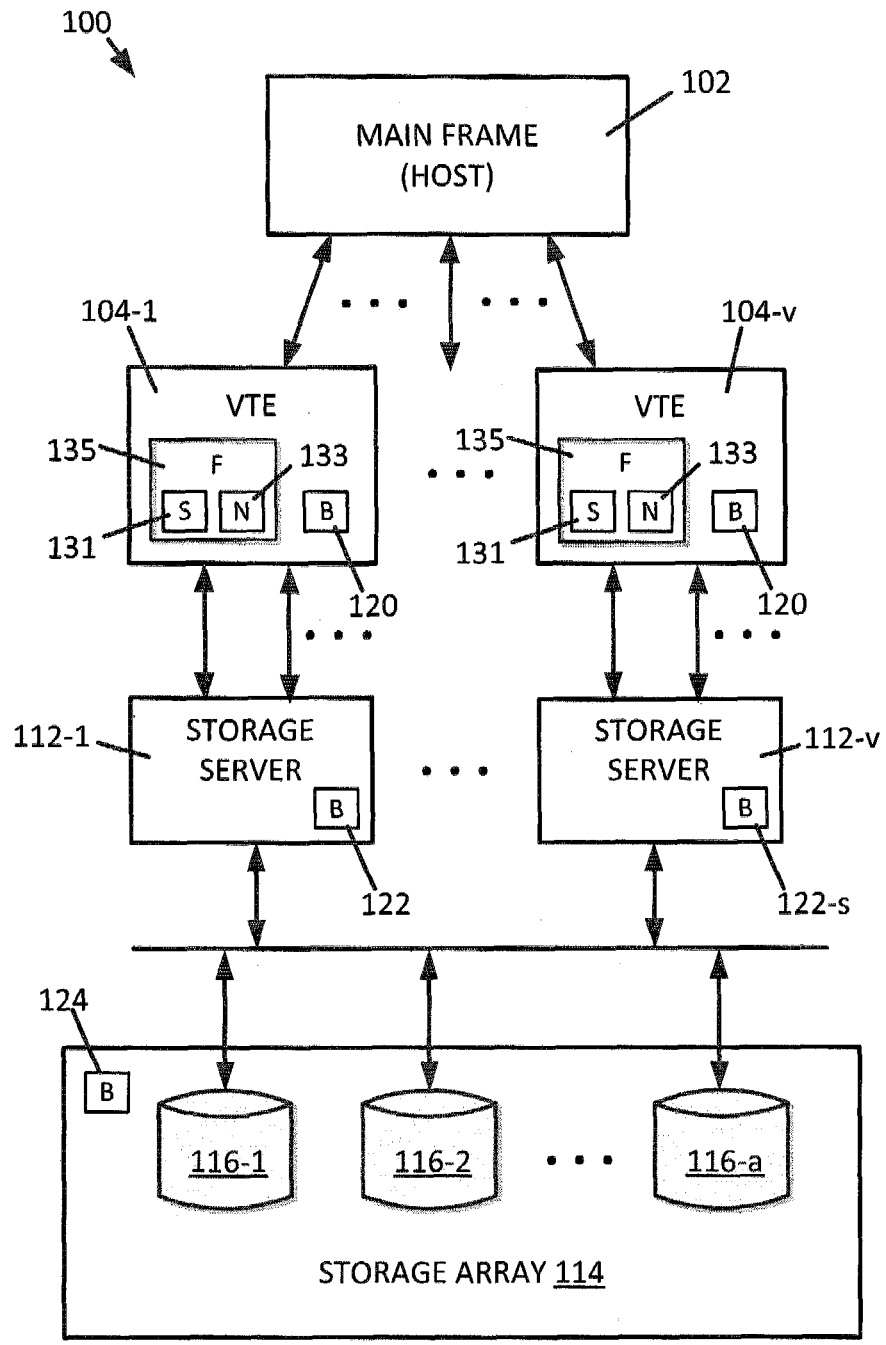
FIG. 1 shows a high-level block diagram of a tape emulation system.

A detailed description of one or more embodiments is provided below along with accompanying figures that illustrate the principles of the invention. While the invention is described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the present invention is not unnecessarily obscured.

It should be appreciated that the embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of improving the performance of named mount operations in a virtual tape engine (VTE) storage system. Some embodiments of the invention can involve named mount methods for VTEs in a distributed system, such as a client-server network, local area network (LAN), wide area network (WAN) or larger scale computer network system; however, those skilled in the art will appreciate that the invention is not limited thereto. Thus, aspects of the one or more embodiments described herein may be implemented on one or more computers executing software instructions, and the computers may be networked in a client-server arrangement or similar distributed computer network.

FIG. 1 illustrates an embodiment of a high-level block diagram showing a data processing environment 100 in which improved named mount performance can be implemented in a virtual tape emulator according to the teachings herein. The environment includes a host also called a mainframe 102 herein, and one or more virtual tape emulation (VTE) subsystems 104-1, . . . , 104-v such as the Disk Library for mainframe (DLm) product available from EMC Corporation of Hopkinton Mass. The tape emulation subsystem(s) 104 connect to the mainframe 102 via high-speed FICON (fiber connection) or ESCON (enterprise system connection) channel data connection(s). Despite using direct access storage devices such as disk drive arrays 116-1, . . . , 116-a as the mass media, they appear to the mainframe 102 as a physical tape drive, and therefore execute typical tape-like commands and respond to such commands in the same way that a physical tape drive would respond. This means that existing work processes based on tape management systems and applications can run on the mainframe 102 without any modifications An example VTE 104-1 operates as an input/output controller between the mainframe 102 and a disk based storage subsystem 116-1, . . . , 116-A that can, for example, be a standard open-systems disk storage subsystem. The VTE 104-1 can thus be said to emulate a given number of virtual tape volumes to the mainframe 102. The VTEs 104-1, . . . , 104-v can also include a local buffer (B) 120 for use emulating tape commands.

The backend storage subsystem stores the data as one of a plurality of tape volume images. Each individual tape volume image written by the mainframe 102, can, for example, be a single disk file. Each of the tape volumes has a volume name which can be the tape volume serial number (VOLSER). The VTEs 104-1, . . . , 104-v can each store and maintain scratch list 131, a named list 133 and a file list 135. The scratch list 131 can include the volume names of the volumes having a "scratch" state and the named list 133 can include the volume names of the volumes having a "named" state. The file list 135 includes all of the volume names from the scratch list 131 and all of the volume names from the named list 133.

The tape emulation subsystem may consist of an internal local area network and one or more storage servers 112-1, . . . , 112-s that manage the backend disk array(s) 116-1, . . . , 116-a. It should be understood that the backend storage arrays 114 may implement a hierarchy of storage protocols such as Redundant Array of Independent Disks (RAID), storage array network (SAN), data de-duplication, replication, garbage collection, and/or other storage management functions that may not be visible to or under the control of the storage servers 112, and are certainly not visible or under the control of the VTEs 104-1, . . . , 104-v or the mainframe 102. The storage servers 112 may typically include one or more internal buffers 122 in which they store data temporarily as it is managed and passed back and forth between the storage arrays 116 and the VTEs 104-1, . . . , 104-v.

In operation, the host mainframe 102 issues mount requests to the VTEs 104-1, . . . , 104-v using typical tape access commands and data is read from and written to disk array(s) 116-1, . . . , 116-a. For writing data, the tape volumes are pre-initialized some time before use, typically in a large batch during installation. During initialization, the tape volumes are created as small files. When mainframe write mounting occurs, data can be recorded onto any available tape, these recorded tape volumes are flagged as having a "scratch" state by the VTEs. Thus, whenever tape volumes are scratched or initialized, the names or volume serial numbers of the recorded tape volumes are added to the scratch list 131 which is maintained by each of the VTEs 104-1, . . . , 104-v.

The data can remain stored in the tape volumes until space is needed. For example, tape volumes can have an expiration date or time. After the expiration date or time has elapsed the tape volumes can be "erased" and the tape volume space is freed to store more data. An erased tape volume continues to exist as a small file, looking much like a newly-initialized scratch tape. When a scratch tape volume is erased, the name of the scratch volume remains on the scratch list.

If the mainframe issues a mount request to a specific tape identified by a specific VOLSER(s) or volume name, the mount request can typically be to read from the specific tape. These recorded volumes to be read are refer to as a "named volume" or an "explicit VOLSER" in the context of mount requests. The VTEs 104-1, . . . , 104-v can identify these tape volumes as having a "named" state and the names of the named state tape volumes can be maintained in a "named list" 133 which is maintained by each of the VTEs 104-1, . . . , 104-v. The names of scratched and erased named volumes can be removed from the named list 133. Although both scratch and named volumes are "named" by their VOLSER, the VTEs 104-1, . . . , 104-v can identify the different use cases for tape volumes that are in the scratch state and named state, to properly satisfy the mount requests from the host.

In order to reduce named mount delays by named mount optimization, the inventive system can include a file list 135 stored on each of the VTEs 104-1, . . . , 104-v that includes all of the tape volume names stored on the scratch volume lists 131 and the named volume lists 133. When a named mount request is received, the VTEs 104-1, . . . , 104-v can search their volume lists 133 for the matching volume name. The mount request can be completed by the VTE having the file list 135 that contains the volume name.

The named mount optimization system is particularly useful for EFS enabled VTEs, where volume names do not include a code for identifying the specific file system that the tape volume is stored. Without the named mount optimization system, the file list would not exist and the named mount request would require all of the VTEs to search through all of their respective file systems to find the named mount location. The named mount optimization system is much more time consuming EFS enabled VTE systems.

As discussed, each VTE 104-1, . . . , 104-v can maintain "file list" which can include all of the volume names from the scratch list and named list. When a named mount is requested, each VTE can search the file list for the requested VOLSER (volume name) rather than searching through each of the VTE's file systems. The mount requested volume will be on the EFS with the file list that includes the corresponding VOLSER. Because a list is searched rather than entire file systems, this file list search process is much more efficient.

With reference to FIG. 2, a portion of an exemplary file list 201 for a VTE is illustrated that includes the volume names 203 and designated states 205. The volume names from the scratch volume list are designed with the state "SCRTCH" 207 and the volumes from the name volume list are designed with the state "NAMED" 209. Thus, the SCRTCH 207 state file names will be on the VTE's scratch list and the NAMED 209 state file names will be on the named list. Each VTE will have different file lists, scratch lists and named lists with different volume names in these lists.

In order for the named mount optimization system to work most efficiently, the name volume lists must be updated constantly. In an embodiment, one or more processes can be performed to update the volume lists. A first process includes adding the names of the tape volumes to the VTE's scratch list as soon as the tape volumes are initialized or scratched. This continuous and immediate updating of the scratch list will then be immediately transferred to the file list. This process will update the file list to always include newly initialized and scratched volume names. Any named mount request for a volume that has been initialized or scratched will be found in the file list. Because each of the VTEs functions independently, the process may not provide or share volume name information with the other VTEs in the system.

A second process for maintaining the file list is to have each VTE poll the file systems for updates to the file lists (scratch lists and named lists) at tunable intervals of time. Using this method, the scratch list and named list are updated each time the file systems are polled and any changes in the volumes associated with each of the VTEs will result in updates to the file list. However, this polling process can require more system resources than the first process and the polling can slow normal VTE operations. For example, if the file systems are being polling at very fast intervals this can maintain a very accurate file list. However, this continuous polling can consume storage reading resources and hinder all other file system functions. If the polling intervals are longer, the polling may not significantly slow the VTEs normal functions but the file list may not be updated as frequently which can potentially lead to delayed volume name changes on the file list.

In an embodiment, the polling intervals of the VTEs can be set by the operator of the VTE system. For example, the system may include a "file list refresh interval" setting which can have a default setting and may also be adjustable by the system operator. In other embodiments, the polling may be based upon the work load of the VTE. The system may detect a high level of activity and then proceed with polling when the activity level decreases. Similarly, if there is little VTE activity, this may indicate that there are fewer changes occurring to the file list and the system may reduce the polling interval to conserve energy since the file list is likely to be accurate for a longer time.

Figure 3:
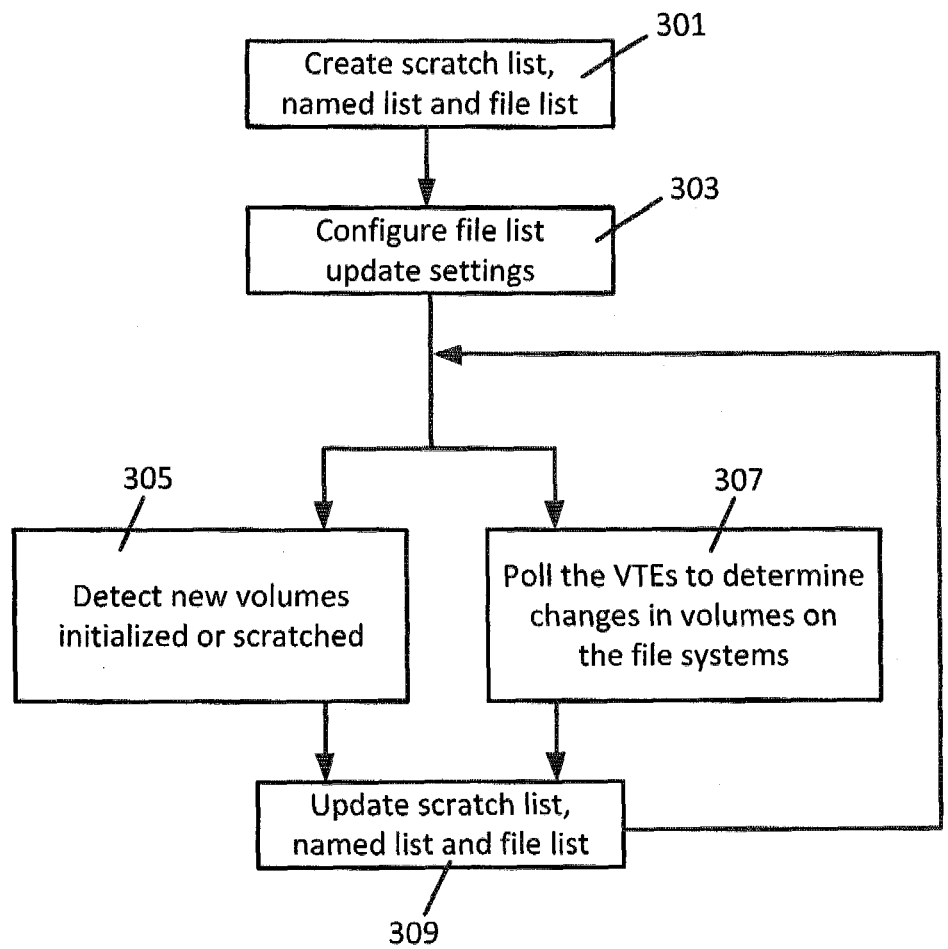
FIG. 3 shows a flow chart of multiple processes used to update the file list for each virtual tape engine.

With reference to FIG. 3, a flow chart illustrating the processes for updating the file list is illustrated. For each VTE, a scratch list, named list and file list are crated 301. The VTE system can allow a system operator to configure the file list update settings 303. For example, the VTE system may allow the system to enable or disable any of the file list update processes and adjust the described file system polling interval. The file list update processing can include detecting volumes that are initialized or scratched to the file systems 305 and polling the VTEs to determine any changes in the volumes stored on the file systems. These new volume detection and polling processes can occur simultaneously. Based upon the new file detection and VTE polling, the scratch, list, named list and file lists for each VTE can be updated 307. The described volume detection, polling and updating process steps can be repeated to maintain the file list for each of the VTEs.

Figure 4:
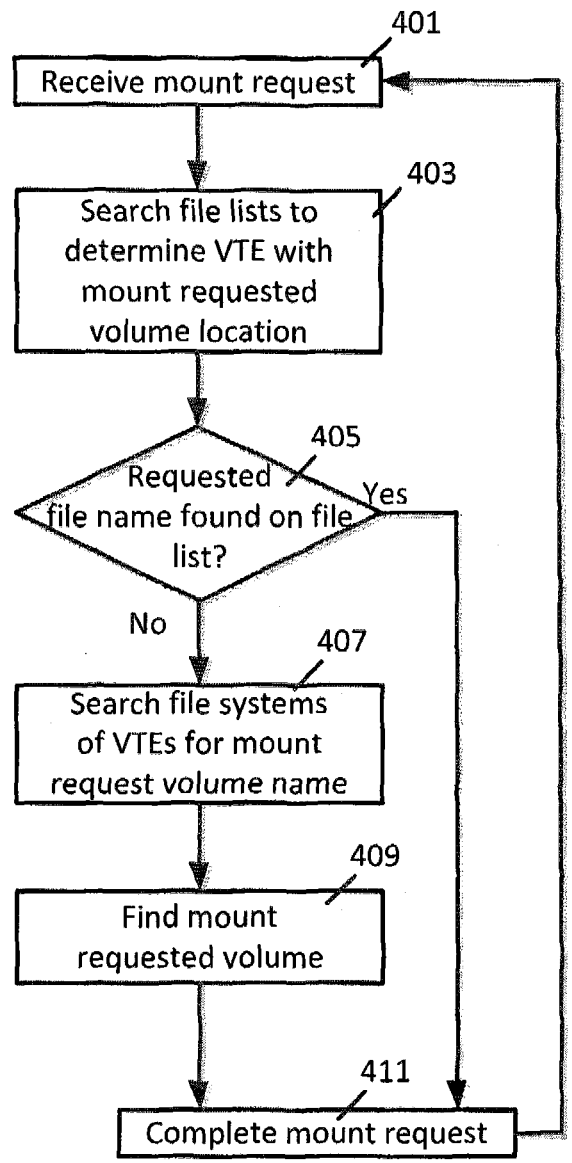
FIG. 4 shows a flow chart of a method of performing name mount requests on enhanced file system (EFS) enabled virtual tape engines (VTEs).

With reference to FIG. 4, a flow chart illustrating the mount request optimization process is illustrated. The VTE system can receive a mount request with a volume name 401. The file lists for each VTE can be searched for the volume name 403. If the volume name is found, the location of the volume name can be determined and the mount request can be completed 411. If the volume name is not found on the file lists of the VTEs, the files systems of each of the VTEs can be searched for the mount request volume name 407. The file mount request volume can then be found 409 and the mount request can be completed 411. This described process can be repeated for all mount requests received by the VTE system.

The improved performance of the named mount optimization has been proven by test results of EFS VTE systems with and without the named mount optimization. About 7,500 mounts were performed on a EFS VTE system and the average mount times were calculated. The testing also determined the number of mounts that had mount times greater than 1 second and a maximum mount time. Table 1 below represents performance test data of an EFS VTE named mount optimization for scratch volume mounts and named volume mounts.

TABLE 1

| Tape volume type | Number of mounts | Average mount time | Number of mounts over 1 second | Longest mount time |
|---|---|---|---|---|
| Scratch | 3244 | 126 ms | 108 | 8.9 sec. |
| Named | 4392 | 645 ms | 1024 | 9.4 sec. |

Table 2 below represents the performance test data of the same EFS VTE system with the named mount optimization implemented with the same average mount time, number of mounts over 1 second and longest mount times for scratch and named volume mounts. The test data indicates that the average mount time performance was improved by about 14% for scratch tape volumes and by about 73% for named tape volumes. The number of mounts greater than 1 second improved by about 18 percent for scratch tape volumes and by about 77% for named tape volumes. The longest mount times were also significantly reduced from 8.9 seconds to 7.0 seconds for scratch volumes and from 9.4 seconds to 5.0 seconds for named volumes. Based upon this performance data, the benefits of the named mount optimization are very clear.

TABLE 2

| Tape volume type | Number of mounts | Average mount time | Number of mounts over 1 second | Longest mount time |
|---|---|---|---|---|
| Scratch | 3241 | 108 ms | 87 | 7.0 sec. |
| Named | 4541 | 172 ms | 235 | 5.0 sec. |

The time values provided above in Tables 1 and 2 are intended to be for example only and to provide an indication of relative performance in certain operational scenarios. Other values may be produced depending on specific test conditions and operational environments.

Although embodiments have been described with respect to optimization based on time factors, such as backup window and/or throughput, it should be noted that other factors may also be considered instead or as well as the time aspect, such as optimization based on processor overhead (CPU cycles), number of active threads, power consumption, and so on. For these embodiments, the historic and test data would be expanded to measure and account for these factors, and a comparison of different backup methods with regard to these factors would be presented to the user for comparison.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   forwarding scratch volumes and named volumes received from a mainframe processor for storage on a plurality of file systems by a plurality of virtual tape engines;
   creating file lists stored on each of the virtual tape engines which include volume names of the scratch volumes and the named volumes on the plurality of file systems;
   polling the plurality of file systems by each of the virtual tape engines for changes in the named volumes and the scratch volumes on the file systems; and
   updating the file lists for each of the plurality of virtual tape engines based upon the changes in the named volumes and the scratch volumes on the file system.

2. The method of claim 1 further comprising:
   detecting changes in scratch lists by the plurality of virtual tape engines; and
   updating the file lists when changes are detected in the scratch lists by the plurality of virtual tape engines.

3. The method of claim 2 wherein the polling the plurality of file systems for each of the virtual tape engines and the detecting changes in the scratch lists occur simultaneously.

4. The method of claim 1 further comprising:
   receiving a mount request for a requested volume name; and
   searching for the requested volume name in the file lists of the virtual tape engines to determine a location of the requested volume name.

5. The method of claim 4 further comprising:
   determining that the requested volume name is not on any of the file lists; and
   searching the plurality of file systems for the requested volume name.

6. The method of claim 4 further comprising:
   determining that some of the plurality of virtual tape engines are stalled; and
   searching the plurality of file systems of the virtual tape engines that are not stalled for the requested volume name.

7. The method of claim 1 wherein the polling of the plurality of file systems for each of the virtual tape engines occurs at predetermined intervals of time.

8. A system for emulating operations of a virtual tape system in a main-frame processor comprising:
   a processor-based system executed on a computer system and configured to:
   forward scratch volumes and named volumes received from a mainframe processor for storage on a plurality of file systems by a plurality of virtual tape engines;
   create file lists stored on each of the virtual tape engines which include volume names of the scratch volumes and the named volumes on the plurality of file systems;
   poll the plurality of file systems by each of the virtual tape engines for changes in the named volumes and the scratch volumes on the file systems; and
   update the file lists for each of the plurality of virtual tape engines based upon the changes in the named volumes and the scratch volumes on the file system.

9. The system of claim 8 wherein the processor-based system is further configured to:
   detect changes in scratch lists by the plurality of virtual tape engines; and
   update the file lists when changes are detected in the scratch lists by the plurality of virtual tape engines.

10. The system of claim 8 wherein the processor-based system is further configured to:
   receive a mount request for a requested volume name; and
   search for the requested volume name in the file lists of the virtual tape engines to determine a location of the requested volume name.

11. The system of claim 10 wherein the processor-based system is further configured to:
   determining that the requested volume name is not on any of the file lists; and
   searching the plurality of file systems for the requested volume name.

12. The system of claim 10 wherein the processor-based system is further configured to poll the plurality of file systems for each of the virtual tape engines at predetermined intervals of time.

13. A computer program product, comprising a non-transitory computer-readable medium having a computer-readable program code embodied therein, the computer-readable program code adapted to be executed by one or more processors to implement a method comprising:
   forwarding scratch volumes and named volumes received from a mainframe processor for storage on a plurality of file systems by a plurality of virtual tape engines;
   creating file lists stored on each of the virtual tape engines which include volume names of the scratch volumes and the named volumes on the plurality of file systems;
   polling the plurality of file systems by each of the virtual tape engines for changes in the named volumes and the scratch volumes on the file systems; and
   updating the file lists for each of the plurality of virtual tape engines based upon the changes in the named volumes and the scratch volumes on the file system.

14. The computer program product of claim 13 wherein the method further comprises:
   detecting changes in scratch lists by the plurality of virtual tape engines; and
   updating the file lists when changes are detected in the scratch lists by the plurality of virtual tape engines.

15. The computer program product of claim 14 wherein in the method the polling the plurality of file systems for each of the virtual tape engines and the detecting changes in the scratch lists occur simultaneously.

16. The computer program product of claim 13 wherein the method further comprises:
   determining that a requested file name is not on the file lists of; and
   reading a requested data file from a file system where a requested volume is found.

17. The computer program product of claim 13 wherein the method further comprises:
   receiving a mount request for a requested volume name; and
   searching for the requested volume name in the file lists of the virtual tape engines to determine a location of the requested volume name.

18. The computer program product of claim 17 wherein the method further comprises:
   determining that the requested volume name is not on any of the file lists; and
   searching the plurality of file systems for the requested volume name.

19. The computer program product of claim 17 wherein the method further comprises:
   determining that some of the plurality of virtual tape engines are stalled; and
   searching the plurality of file systems of the virtual tape engines that are not stalled for the requested volume name.

20. The computer program product of claim 13 wherein in the method the polling of the plurality of file systems for each of the virtual tape engines occurs at predetermined intervals of time.

* * * * *